United States Patent
Kim et al.

(10) Patent No.: US 10,454,095 B2
(45) Date of Patent: Oct. 22, 2019

(54) ANODE ACTIVE MATERIAL FOR LITHIUM SECONDARY BATTERY, ANODE AND LITHIUM SECONDARY BATTERY INCLUDING THE SAME

(71) Applicant: SK INNOVATION CO., LTD., Seoul (KR)

(72) Inventors: Hyo Sang Kim, Daejeon (KR); Sang Jin Kim, Daejeon (KR); Jung Hwan Kim, Daejeon (KR); Jee Hee Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 112 days.

(21) Appl. No.: 15/606,797

(22) Filed: May 26, 2017

(65) Prior Publication Data

US 2017/0352871 A1 Dec. 7, 2017

(30) Foreign Application Priority Data

Jun. 2, 2016 (KR) .................. 10-2016-0068987

(51) Int. Cl.
| | | |
|---|---|---|
| *H01M 4/13* | (2010.01) | |
| *H01M 10/65* | (2014.01) | |
| *H01M 4/133* | (2010.01) | |
| *H01M 10/651* | (2014.01) | |
| *H01M 4/38* | (2006.01) | |
| *H01M 4/62* | (2006.01) | |
| *H01M 10/0525* | (2010.01) | |
| *H01M 4/36* | (2006.01) | |
| *H01M 4/587* | (2010.01) | |
| *H01M 10/42* | (2006.01) | |
| *H01M 4/04* | (2006.01) | |

(Continued)

(52) U.S. Cl.
CPC .......... *H01M 4/133* (2013.01); *H01M 4/364* (2013.01); *H01M 4/382* (2013.01); *H01M 4/587* (2013.01); *H01M 4/621* (2013.01); *H01M 10/0525* (2013.01); *H01M 10/651* (2015.04); *C01B 32/205* (2017.08); *C01P 2002/72* (2013.01); *H01M 4/0404* (2013.01); *H01M 4/1393* (2013.01); *H01M 2004/021* (2013.01); *H01M 2010/4292* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| RE43,724 E | * | 10/2012 | Kim .................. | H01M 10/0569 429/218.1 |
| 2008/0305394 A1 | * | 12/2008 | Hisamitsu ............... | H01M 4/13 429/209 |

(Continued)

FOREIGN PATENT DOCUMENTS

KR    10-2005-0004930 A    1/2005

*Primary Examiner* — Scott J. Chmielecki
(74) *Attorney, Agent, or Firm* — The PL Law Group, PLLC

(57) ABSTRACT

An anode active material for lithium secondary battery includes a secondary particle formed by agglomerating primary particles, an average diameter of the primary particles is in a range from 5 μm to 15 μm, and an average diameter of the secondary particle is in a range from 10 μm to about 25 μm. The primary particles include an artificial graphite, and an I(110)/I(002) of the secondary particle is in a range from about 0.0075 to 0.012.

7 Claims, 2 Drawing Sheets

(51) Int. Cl.
*H01M 4/1393* (2010.01)
*H01M 4/02* (2006.01)
*C01B 32/205* (2017.01)

(56) References Cited

U.S. PATENT DOCUMENTS

| | | | |
|---|---|---|---|
| 2013/0011747 A1* | 1/2013 | Sasaki | H01M 4/0404 |
| | | | 429/336 |
| 2015/0194668 A1* | 7/2015 | Ueda | H01M 4/587 |
| | | | 429/231.4 |
| 2015/0318545 A1* | 11/2015 | Satow | H01M 4/133 |
| | | | 429/324 |
| 2016/0276657 A1* | 9/2016 | Song | H01M 4/366 |
| 2016/0322636 A1* | 11/2016 | Lee | H01M 4/1393 |
| 2017/0133679 A1* | 5/2017 | Ko | H01M 4/133 |

* cited by examiner

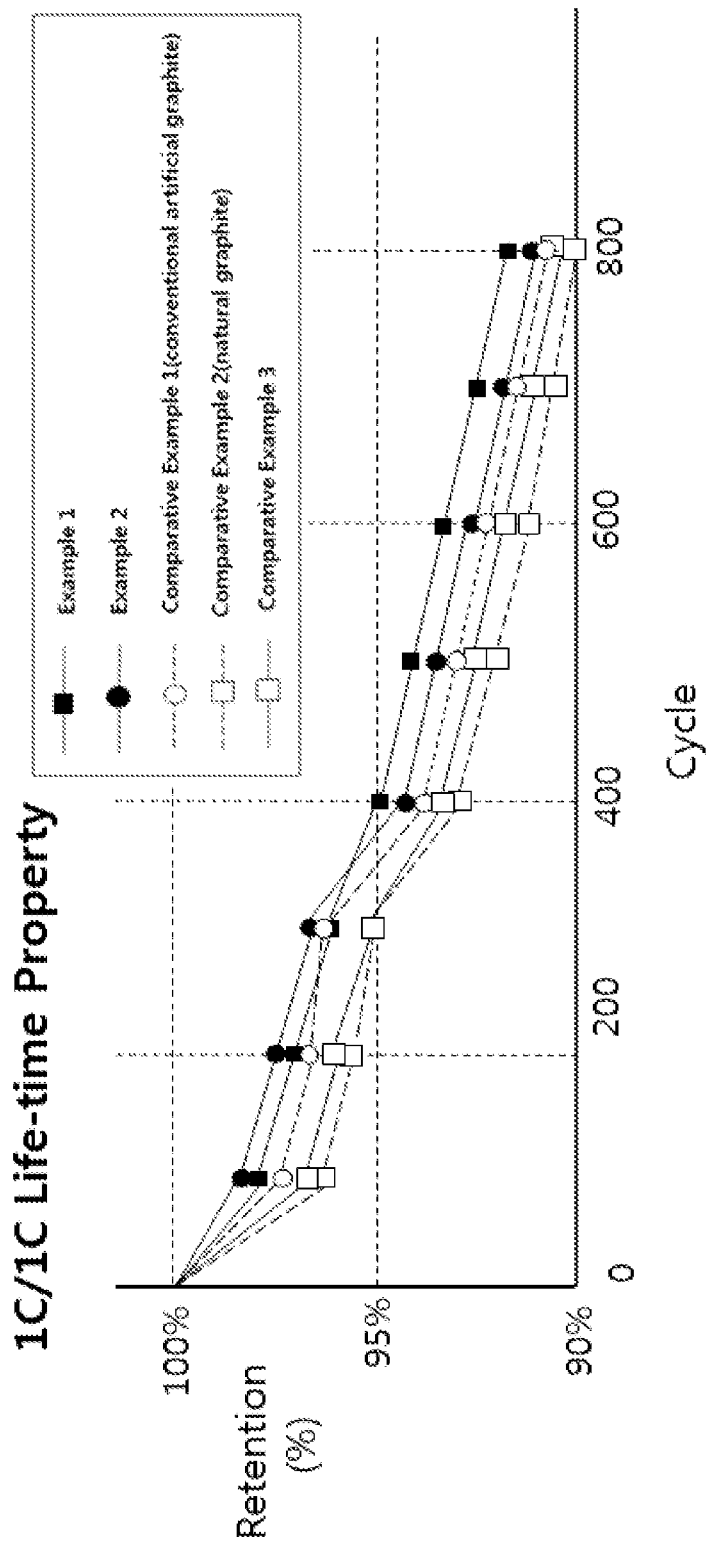

ANODE ACTIVE MATERIAL FOR LITHIUM SECONDARY BATTERY, ANODE AND LITHIUM SECONDARY BATTERY INCLUDING THE SAME

CROSS-REFERENCE TO RELATED APPLICATION

This application claims priority to Korean Patent Application No. 10-2016-0068987 filed on Jun. 2, 2016 in the Korean Intellectual Property Office (KIPO), the entire disclosure of which is incorporated by reference herein.

BACKGROUND

1. Field

Example embodiments relate to anode active materials for a lithium secondary battery, and anode and lithium secondary battery including the same.

2. Description of the Related Art

Recently, mobile electronic and telecommunication devices such as a mobile phone, a camcorder, a laptop computer, etc., have become widespread as electronic and information technology industries have been rapidly developed. Accordingly, a lithium secondary battery has also been actively developed as a power source for the devices. For example, the lithium secondary battery may be implemented as an eco-friendly power source in an electric vehicle, an uninterruptible power source, an electrically-driven tool, an artificial satellite, etc.

The lithium secondary battery that has been developed from early 1990's may include an anode containing carbon-based material capable of adsorbing and discharging lithium ions, a cathode containing lithium-based oxide, and a non-aqueous electrolyte containing a mixed organic solvent and a proper amount of a lithium salt dissolved therein.

Amorphous or crystalline carbon may be used as an anode (e.g., a negative electrode) active material. Preferably, crystalline carbon may be used due to high capacity. Crystalline carbon may include a natural graphite, an artificial graphite, etc.

The artificial graphite may have an improved charging and discharging efficiency, however, may have a low capacity.

For example, Korean Patent Laid-Open Publication No. 10-2005-0004930 discloses an anode active material including an artificial graphite which has limited capacity and power.

SUMMARY

Accordingly, it is an aspect of the present invention to provide an anode active material for a lithium secondary battery having improved power, life-time and thermal stability.

Further, it is an aspect of the present invention to provide an anode and a lithium secondary battery including the anode active material.

According to example embodiments, there is provided an anode active material for a lithium secondary battery comprising a secondary particle formed from primary particles. An average diameter of the primary particles may be in a range from 5 μm to 15 μm, and an average diameter of the secondary particle may be in a range from 10 μm to about 25 μm. The primary particles may include an artificial graphite, and an $I(110)/I(002)$ of the secondary particle may be in a range from about 0.0075 to 0.012.

In example embodiments, the $I(110)/I(002)$ of the secondary particle may be in a range from about 0.0075 to 0.01.

In example embodiments, the average diameter of the primary particles may be in a range from 7 μm to 10 μm.

In example embodiments, the average diameter of the secondary particle may be in a range from 13 μm to 20 μm.

According to example embodiments, there is provided a lithium secondary battery comprising an anode including the anode active material above, a cathode, and a separation layer interposed between the anode and the cathode.

In example embodiments, a density of the anode may be at least 1.6 g/cc.

In example embodiments, the anode may further include a binder, and an amount of the binder may be equal to or less than 3 weight percent (wt %) based on a total amount of the anode active material and the binder.

The anode active material for the lithium secondary battery according to example embodiments as described above may improve a power-related property of a battery such as charging and discharging power.

The anode active material may also improve a life-time and thermal stability of the battery.

BRIEF DESCRIPTION OF THE DRAWINGS

Example embodiments will be more clearly understood from the following detailed description taken in conjunction with the accompanying drawings.

FIG. 2 is a graph showing a capacity retention in relation to cycles of lithium secondary batteries.

DETAILED DESCRIPTION

Figure 1:
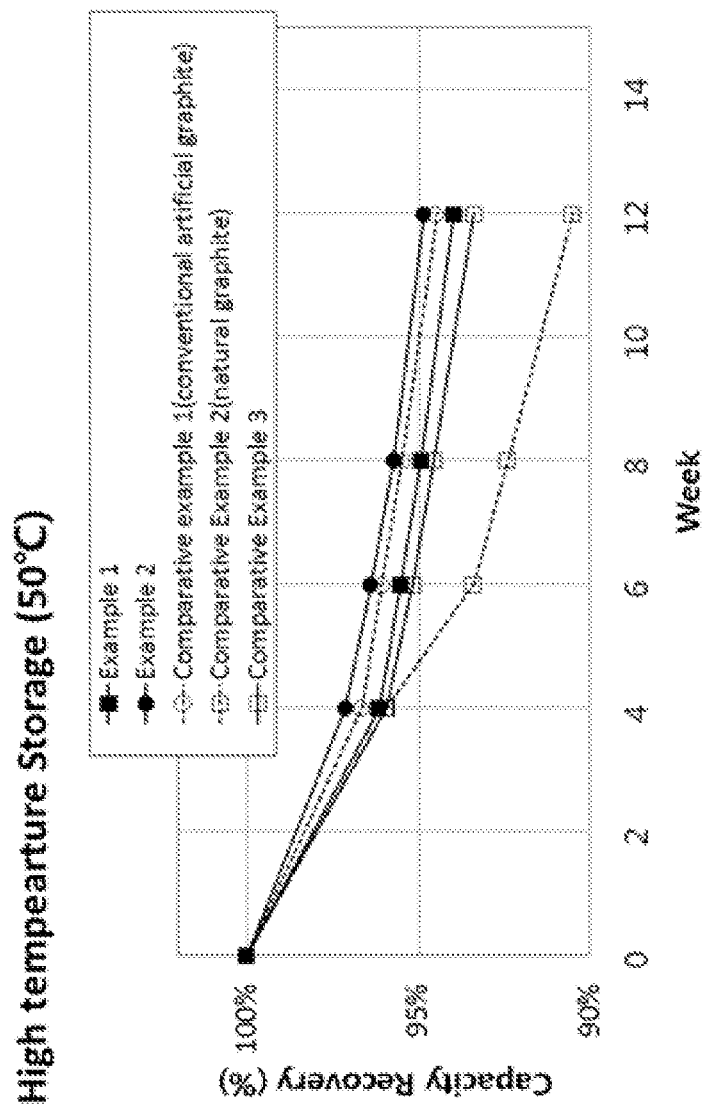
FIG. 1 is a graph showing a capacity recovery (%) in relation to weeks of lithium secondary batteries.

According to example embodiments of the present inventive concepts, an anode active material for a lithium secondary battery may include a secondary particle having an average diameter from about 10 μm to about 25 μm formed by agglomerating primary particles having an average diameter from about 5 μm to about 15 μm. The primary particles may include an artificial graphite, and the secondary particle may have an $I(110)/I(002)$ in a range from about 0.0075 to about 0.012. Accordingly, the anode active material for the lithium secondary battery may improve a power-related property of a battery such as charging and discharging power, and may also improve a life-time, a low temperature property and a storage property in high temperature of the battery.

Hereinafter, some exemplary embodiments of the present inventive concepts will be provided. However, these embodiments are only given for illustrating the present inventive concepts, and are not to be construed as limiting the scope of the present invention.

Anode Active Material for Lithium Secondary Battery

The anode (e.g., a negative electrode) active material for the lithium secondary battery may be used for absorption or occlusion of lithium ions, and may include an amorphous graphite or a crystalline graphite. The crystalline graphite may include a natural graphite, an artificial graphite, etc. When the natural graphite is used as an anode active material, a filter blocking may be caused during a mixing process, and a slurry dispersive property may be degraded to result in defective electrode fabrication. The artificial graphite may be relatively free from to the above problems, and may have enhanced life-time and storage property in high temperature. However, the artificial graphite may be disadvantageous in an aspect of a battery output or a battery power. Thus, the artificial graphite may not be easily employed to a high power device (e.g., a vehicle battery).

According to example embodiments of the present inventive concepts, an artificial graphite in which primary particles having an average diameter of a specific range may be assembled into a secondary particle having an average diameter and an I(110)/I(002) of specific ranges may be used. Thus, when the artificial graphite is employed to a battery, a battery output or a battery power may be increased while maintaining improved life-time and high temperature storage properties. Further, an energy density of the battery may be enhanced by using the artificial graphite having an improved rolling property.

According to example embodiments, the secondary particle may have an average diameter ($D_{50}$) in a range from about 10 µm to about 25 µm, and the secondary particle may be formed by including the primary particles having an average diameter in a range from about 5 µm to about 15 µm. The I(110)/I(002) of the secondary particle may be in a range from about 0.0075 to about 0.012. Accordingly, the battery output or the battery power during charging and discharging the battery may be increased while maintaining improved life-time and high temperature storage properties as described above.

If the average diameter of the primary particles is less than about 5 µm, a production yield may be decreased when preparing materials, and a life-time of the battery may be degraded. If the average diameter of the primary particles exceeds about 15 µm, a size or a dimension of the secondary particle may become excessively large to be applied to the battery.

The primary particles may be agglomerated to form the secondary particle. The number of the primary particles for forming the secondary particle is not specifically limited. For example, 3 to 9 primary particles may be assembled to form the secondary particle.

If the average diameter of the secondary particle is less than about 10 µm, a pore size generated during a fabrication of an electrode may become excessively small to cause a poor impregnation in the battery. The average diameter of the secondary particle exceeds about 25 µm, a thickness of the electrode may be excessively increased.

In some embodiments, the average diameter of the primary particles may be in a range from about 7 µm to about 10 µm so that the battery power or the battery output may be further improved while suppressing a reduction of the life-time and high temperature storage properties.

In some embodiments, the average diameter of the secondary particle may be in a range from about 13 µm to about 20 µm so that an application to the electrode may be facilitated.

If an orientation of each primary particle in the artificial graphite is randomly distributed, a lithium ion transfer through the artificial graphite may be facilitated. According to example embodiments of the present inventive concepts, an orientation of the particle may be controlled to further improve the battery output or the battery power.

The orientation of the particle may be determined by an X-ray diffraction (XRD) analysis. Specifically, an incident X-ray of a specific wavelength ($\lambda$) may generate diffracted peaks of different intensity at a specific incidence angle ($\theta$) or diffraction angle ($2\theta$). A ratio of specific peaks may be calculated to determine the orientation of the particle.

An I(002) recited in the present application indicates an intensity (height) of a peak near a position of $2\theta=26.5$ in the XRD analysis. An I(110) recited in the present application indicates an intensity (height) of a peak near a position of $2\theta=77.5$ in the XRD analysis. A ratio of I(110) relative to I(002) is represented by the I(110)/I(002).

Conditions of the XRD analysis widely known in the related art may be utilized. For example, the conditions as represented below may be employed.

X-ray: Cu K alpha, K-Alphalwavelength: 1.540598 Å
Generator voltage: 40 kV, Tube current: 30 mA
Scan Range: 10~80 Scan, Step Size: 0.026
Ni filter, Sollar slit (0.04 rad, 2ea), Diffracted antiscatter slit 7.5 mm
Divergence slit: ¼°, Antiscatter slit: ½°
Time per step: 100 s In example embodiments, the I(110)/I(002) of the secondary particle may be in a range from about 0.0075 to about 0.012 from an aspect of improving the battery output or the battery power. For example, the battery output or the battery power during charging and discharging the battery may be enhanced within the above range. In some embodiments, the I(110)/I(002) of the secondary particle may be preferably in a range from about 0.0075 to about 0.01.

If the I(110)/I(002) of the secondary particle is less than about 0.0075, the anode active material may not be easily formed, and a basic electrochemical property (e.g., a capacity) of the artificial graphite may be deteriorated due to an excessive control of particle shape and size.

A shape of the primary particle may be selected in consideration of adsorption and desorption of lithium ions, and may not be specifically limited. For example, a sphere shape or a plate shape may be employed for improving a functional property of the anode active material in the lithium secondary battery.

In some embodiments, the anode active material may further include a commonly used material without departing from the present inventive concepts. For example, a silicon-based active material; a carbon-based active material such as crystalline carbon, amorphous carbon, a carbon composite, a carbon fiber, etc.; lithium; an alloy of lithium and other element; a transition metal oxide; a material capable of doping and undoping lithium; and/or a material capable of reversibly reacting with lithium and forming a compound may be used. These may be used alone or in a combination thereof.

The amorphous carbon may include, for example, hard carbon, cokes, mesocarbon microbead (MCMB) calcined at a temperature of 1500° C. or less, mesophase pitch-based carbon fiber (MPCF), or the like. The crystalline carbon may include a natural graphite.

The other element forming the lithium alloy may include, for example, aluminum, zinc, bismuth, cadmium, antimony, silicon, lead, tin, gallium or indium.

The silicon-based active material may include any material commonly used as the anode active material in the related art. For example, the silicon-based active material may include silicon, silicon oxide, a silicon alloy, a silicon-carbon composite, etc. These may be used alone or in a combination thereof.

The transition metal oxide, the material capable of doping and undoping lithium and the material capable of reversibly reacting with lithium and forming the compound may include vanadium oxide, lithium vanadium oxide, Sn, $SnO_2$, a tin alloy composite, etc.

Anode

The anode active material according to example embodiments as described above may be mixed and stirred with, e.g., a solvent, a binder, a conductive agent, a dispersive agent to prepare a mixture. The mixture may be coated on a metal-based collector, and pressed and dried to form an anode in the lithium secondary battery The solvent may include a non-aqueous solvent, e.g., N-methyl-2-pyrrolidone (NMP), dimethyl formamide, dimethyl acetamide, N,N-dimethyl aminopropylamine, ethylene oxide, tetrahydrofuran, etc.

Non-limiting examples of the binder may include an organic-based binder such as vinylidenefluoride-hexafluoropropylene copolymer (PVDF-co-HFP), polyvinylidenefluoride (PVDF), polyacrylonitrile, polymethylmethacrylate, etc., or an aqueous binder such as styrene-butadien rubber (SBR) combined with a thickening agent such as carboxymethyl cellulose (CMC).

An amount of the binder may be properly adjusted to form an electrode. For example, the amount of the binder may not be greater than about 3 weight percent (wt %) based on a total amount of the anode active material and the binder, so that a resistance property of the electrode may be improved. A lower limit of the amount of the binder may be properly adjusted to maintain an electrode operation. For example, the lower limit of the amount of the binder may be about 0.5 wt % or about 1 wt % based on the total amount of the anode active material and the binder The conductive agent may include, e.g., a conductive carbon-based material commonly used in the related art.

The metal-based collector may include a metal having high conductivity and capable of being easily coated with a mixture of the cathode or anode active material without reactivity in a voltage range of the battery. An anode collector may include copper or an alloy of copper, but it is not limited thereto. In some embodiments, the anode collector may include stainless steel, nickel, copper, titanium or an alloy thereof; copper or stainless steel being subjected to a surface treatment with carbon, nickel, titanium or silver; or the like.

According to example embodiments, the anode active material may be coated on the anode collector by a method commonly used in the related art. For example, the anode active material may be mixed and stirred with the solvent and optionally with the binder, the conductive agent, the dispersive agent, etc., to form a mixture. The mixture may be coated on the anode collector by a spray coating method, an immersion method, etc., and dried and pressed to form the anode.

An electrode density of the anode may not be specifically limited. In some embodiments, the electrode density may be equal to or greater than about 1.5 g/cc. Non-limiting examples of an upper limit of the electrode density may be about 1.65 g/cc, 1.7 g/cc, or the like. Within the above range, power, life-time and high temperature storage properties of the battery may be improved.

Lithium Secondary Battery

A lithium secondary battery may include the anode including the above-mentioned anode active material, a cathode and a separation layer therebetween.

The separation layer may be interposed between the cathode and the anode according to example embodiments to form an electrode structure. The electrode structure may be accommodated in a battery case, and then an electrolyte may be injected in the battery case to form the lithium secondary battery.

Cathode

The cathode may include a cathode active material widely used in the related art.

The cathode active material may be coated on a cathode collector to form the cathode.

The cathode collector may include aluminum or an alloy of aluminum, but it is not limited thereto. In some embodiments, the cathode collector may include stainless steel, nickel, aluminum, titanium or an alloy thereof; aluminum or stainless steel being subjected to a surface treatment with carbon, nickel, titanium or silver; or the like.

The cathode active material may include any material commonly used in the related art without particular limitation thereof. For example, a composite oxide containing lithium and at least one of cobalt, manganese or nickel may be preferably used. In some embodiments, lithium-containing compounds represented by the following formulae may be used.

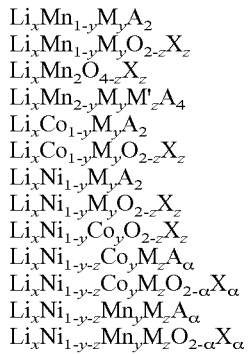

In the formulae above, $0.9 \leq x \leq 1.1$, $0 \leq y \leq 0.5$, $0 \leq z \leq 0.5$, $0 \leq \alpha \leq 2$, and M and M' may be the same as or different from each other. M and M' may be selected from Mg, Al, Co, K, Na, Ca, Si, Ti, Sn, V, Ge, Ga, B, As, Zr, Mn, Cr, Fe, Sr, V or rare earth elements. A may be selected from O, F, S or P, and X may be selected from F, S or P.

The cathode active material may be coated on the cathode collector by a method commonly used in the related art. For example, the cathode active material may be mixed and stirred with a solvent and optionally with a binder, a conductive agent, a dispersive agent, or the like to obtain a mixture. The mixture may be coated and pressed on the cathode collector, and may be dried to form the cathode.

The solvent may include a non-aqueous solvent, e.g., N-methyl-2-pyrrolidone (NMP), dimethyl formamide, dimethyl acetamide, N,N-dimethyl aminopropylamine, ethylene oxide, tetrahydrofuran, etc.

Non-limiting examples of the binder may include an organic-based binder such as vinylidenefluoride-hexafluoropropylene copolymer (PVDF-co-HFP), polyvinylidenefluoride (PVDF), polyacrylonitrile, polymethylmethacrylate, etc., or an aqueous binder such as styrene-butadien rubber (SBR) combined with a thickening agent such as carboxymethyl cellulose (CMC).

The conductive agent may include, e.g., a conductive carbon-based material commonly used in the related art.

Separation Layer

The separation layer may include a conventional porous polymer film prepared from a polyolefin-based polymer such as ethylene homopolymer, propylene homopolymer, ethylene/butane copolymer, ethylene/hexene copolymer or ethylene/methacrylate copolymer, or the like. These may be used alone or in a combination thereof. The separation layer may include a non-woven fabric formed of a conventional porous non-woven fabric, a glass fiber of a high melting temperature, a polyethylene terephthalate fiber, etc. The separation layer may be applied to the battery by winding, laminating with the electrode or folding.

Non-Aqueous Electrolyte

A non-aqueous electrolyte may include a lithium salt and an organic solvent.

The lithium salt commonly used in a lithium secondary battery may be used without a particular limitation, and may be represented by $Li^+X^-$.

Non-limiting examples of anions of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

The organic solvent commonly used in an electrolyte for the lithium secondary battery may be used without a particular limitation. For example, the organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, fluoro ethylene carbonate (FEC), dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The non-aqueous electrolyte may be injected to the electrode structure including the cathode, the anode and the separation layer therebetween so that the lithium secondary battery may be obtained.

A shape of the lithium secondary battery may not be particularly limited. For example, the lithium secondary battery may be prepared as a cylindrical type using a can, a polygonal type, a pouch type or a coin type.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

An artificial graphite was grinded using cokes and a collision type mill to form primary particles, an average diameter ($D_{50}$) of which was 7.5 μm.

The primary particles were agglomerated using pitch to form a secondary particle, and then a thermal treatment was performed at 3,000° C. to form an anode active material for a lithium secondary battery ($D_{50}$=17.3 μm, La(100)=31, Lc(002)=22, I(110)/I(002)=0.0108).

Example 2

An anode active material for the lithium secondary battery was formed by a method the same as that of Example 1 except that the average diameter of the primary particles was 7.2 μm, and $D_{50}$=15.3 μm, La(100)=23, Lc(002)=21, I(110)/I(002)=0.0084 in the secondary particle.

Comparative Example 1

An anode active material for the lithium secondary battery was formed by a method the same as that of Example 1 except that $D_{50}$=19.0 μm, La(100)=27, Lc(002)=20 and I(110)/I(002)=0.0126, and an artificial graphite which was not an assembly of a plurality of particles was used.

Comparative Example 2

An anode active material for the lithium secondary battery was formed by a method the same as that of Example 1 except that $D_{50}$=11.9 μm, La(100)=79, Lc(002)=29 and I(110)/I(002)=0.0100, and a natural graphite which was not an assembly of a plurality of particles was used.

Comparative Example 3

An anode active material for the lithium secondary battery was formed by a method the same as that of Example 1 except that the average diameter ($D_{50}$) of the primary particles was 9.4 μm, and $D_{50}$=13.8 μm, La(100)=60, Lc(002)=25, I(110)/I(002)=0.0169 in the secondary particle.

Comparative Example 4

An anode active material for the lithium secondary battery was formed by a method the same as that of Example 1 except that the average diameter ($D_{50}$) of the primary particles was 16 μm, and $D_{50}$=20 μm, La(100)=70, Lc(002)=20, I(110)/I(002)=0.0110 in the secondary particle Comparative Example 5

An anode active material for the lithium secondary battery was formed by a method the same as that of Example 1 except that the average diameter ($D_{50}$) of the primary particles was 3 μm, and $D_{50}$=12 μm, La(100)=45, Lc(002)=27, I(110)/I(002)=0.0900 in the secondary particle.

Comparative Example 6

The Average Diameter of the Secondary Particle was Beyond the Range According the Present Inventive Concepts An anode active material for the lithium secondary battery was formed by a method the same as that of Example 1 except that the average diameter ($D_{50}$) of the primary particles was 12 μm, and $D_{50}$=26 μm, La(100)=80, Lc(002)=40, I(110)/I(002)=0.097 in the secondary particle.

Properties of the anode active materials are listed in Table 1 below.

TABLE 1

| | Anode Active Material Type | Average Diameter of Particle (μm) | | I(110)/I(002) |
| --- | --- | --- | --- | --- |
| | | Primary Particle | Secondary Particle | |
| Example 1 | Assembly | 7.5 | 17.3 | 0.0108 |
| Example 2 | Assembly | 7.2 | 15.3 | 0.0084 |
| Comparative Example 1 | Conventional Artificial Graphite | 19.0 | — | 0.0126 |
| Comparative Example 2 | Natural Graphite | 11.9 | — | 0.0100 |
| Comparative Example 3 | Assembly | 9.4 | 13.8 | 0.0169 |
| Comparative Example 4 | Assembly | 16 | 20 | 0.0110 |
| Comparative Example 5 | Assembly | 3 | 12 | 0.0900 |
| Comparative Example 6 | Assembly | 12 | 26 | 0.0970 |

Preparation Example

Anode 92.2 wt % of the anode active materials described in Examples and Comparative Examples, 2.8 wt % of a PVDF-based binder and 5 wt % of dimethyl sulfoxide (DMSO) were mixed to form an anode slurry. The anode slurry was coated on a copper substrate, dried and pressed to form an anode. A density of the anode was 1.6 g/cc.

Cathode $Li_{1.0}Ni_{0.6}Co_{0.2}Mn_{0.2}O_2$ as a cathode active material, Denka black as a conductive agent, and PVDF as a binder, and N-methyl pyrrolidone as a solvent were used in a weight ratio of 46:2.5:1.5:50, respectively, to prepare a cathode mixture. The cathode mixture was coated on an aluminum substrate, followed by drying and pressing to prepare a cathode.

Battery

The cathode and anode as prepared above were notched and stacked. A separation layer (polyethylene, 25 μm) was interposed between the cathode and the anode to form a battery structure. Tab portions of the cathode and the anode were welded.

The electrode structure was put in a pouch, and the tab portions were placed at a sealing portion. Three sides of the pouch except for an injecting area of an electrolyte were sealed. The electrolyte was injected through the injecting area, and a remaining side of the pouch was sealed. The electrode structure was impregnated for more than 12 hours. The electrolyte used herein was formed by preparing 1M $LiPF_6$ solution with a mixed solvent of ethylene carbonate (EC)/ethylmethyl carbonate (EMC)/diethyl carbonate (DEC) (25/45/30; volume ratio), and adding 1 wt % of vinylene carbonate (VC), 0.5 wt % of 1,3-propene sultone (PRS), and 0.5 wt % of lithium bis(oxalato)borate (LiBOB) thereto.

Subsequently, a pre-charging was performed by applying a current corresponding to 0.25 C (2.5 A) for 36 minutes. After 1 hour, a degassing, an aging for more than 24 hours, and a formation charging/discharging were performed (Charging condition: CC-CV 0.2 C 4.2V 0.05 C CUT-OFF, Discharging condition: CC 0.2 C 2.5V CUT-OFF).

Next, a standard charging/discharging was performed (Charging condition: CC-CV 0.5 C 4.2V 0.05 C CUT-OFF, Discharging condition: CC 0.5 C 2.5V CUT-OFF).

Experimental Example 1

A discharging power (10 seconds), a charging power (10 seconds), a discharging HPPC (Hybrid pulse power characterization), a charging HPPC, a discharging DC-IR and a charging DC-IR of the lithium secondary battery as prepared above were measured, and the results are listed in Table 2 below.

<Measurement of the 10 Seconds Discharging Power>

Controlling a discharging current in a state of 50% SOC, a current was measured when a battery voltage was dropped to 2.5 V in 10 seconds and an average voltage was measured. The discharging power was determined as a multiplication of the current and the average voltage.

<Measurement of the 10 Seconds Charging Power>

Controlling a charging current in a state of 50% SOC, a current was measured when a battery voltage was raised to 4.3 V in 10 seconds and an average voltage was measured. The charging power was determined as a multiplication of the current and the average voltage.

<Measurement of the Discharging/Charging DC-IR>

Discharging/charging currents corresponding to 0.2 C/0.5 C/1 C/2 C/3 C were flowed to cells, and each voltage drop was measured. The measured values were plotted linearly in a V-I graph, and a slop of the graph was determined as a resistance.

TABLE 2

|   | Discharging Power (10 secs) (W) | Charging Power (10 secs) (W) | Discharging HPPC (W/kg) | Charging HPPC (W/kg) | Discharging DC-IR (mΩ) | Charging DC-IR (mΩ) |
|---|---|---|---|---|---|---|
| Example 1 | 565.3 | 661.1 | 2650 | 2312 | 4.06 | 4.17 |
| Example 2 | 585.7 | 658.1 | 2746 | 2413 | 3.94 | 4.00 |
| Comparative Example 1 | 547.9 | 657.7 | 2498 | 2224 | 4.31 | 4.33 |
| Comparative Example 2 | 592.7 | 657.7 | 2840 | 2504 | 3.78 | 3.83 |
| Comparative Example 3 | 550.3 | 644.0 | 2563 | 2252 | 4.22 | 4.29 |
| Comparative Example 4 | 530 | 629 | 2560 | 2230 | 4.43 | 4.7 |
| Comparative Example 5 | 539 | 633 | 1970 | 2000 | 4.4 | 4.7 |
| Comparative Example 6 | 522 | 622 | 2390 | 2100 | 4.56 | 4.9 |

Referring to Table 2, the lithium secondary batteries of Examples 1 and 2 showed improved results relatively to the lithium secondary batteries of Comparative Example 1 formed of the conventional artificial graphite.

The lithium secondary battery of Comparative Example 2 formed of the natural graphite showed improved results from an aspect of power, however, showed degraded results regarding high temperature storage and life-time as described in Experimental Examples 2 and 3 below.

Experimental Example 2

High temperature storage properties at 50° C. were evaluated as described below using the lithium secondary batteries according to Example 1, Example 2, Comparative Example 1, Comparative Example 2 and Comparative Example 3.

<High Temperature Storage Property>

Cells having high capacity of at least 10 Ah were fabricated using the same cathode. The cells were fully charged by charging in a constant current (CC) condition to 4.2 V at a rate of 1 C and then applying a constant voltage (CV) to 0.1 C. The fully charged cells were left in a chamber at a constant temperature (60° C.) for a predetermined time. Subsequently, the cells were taken out from the chamber and cooled, and capacities of the cells were measured.

FIG. 1 is a graph showing a capacity recovery (%) in relation to weeks of lithium secondary batteries.

Referring to FIG. 1, reductions of the capacity recovery (%) in the lithium secondary batteries of Examples were smaller over a predetermined time range than those in the lithium secondary batteries of Comparative Example 2 or 3. Thus, the lithium secondary batteries of Examples showed improved high temperature storage properties.

Experimental Example 3

Life-time properties were evaluated as described below using the lithium secondary batteries according to Example 1, Example 2, Comparative Example 1, Comparative Example 2 and Comparative Example 3.

<Life-Time Property>

Cells having high capacity of at least 10 Ah were fabricated using the same cathode. Life-time evaluation of the cells were performed in a chamber at a constant temperature (25° C.) using conditions of DOD90 range and 1 C charging/1 C discharging rate.

FIG. 2 is a graph showing a capacity retention in relation to cycles of lithium secondary batteries.

Referring to FIG. 2, reductions of the retention (%) in the lithium secondary batteries of Examples were smaller over a predetermined time range than those in the lithium secondary batteries of Comparative Example 2 or 3. Thus, the lithium secondary batteries of Examples showed improved life-time properties.

Therefore, the lithium secondary batteries of Examples showed improved power, high temperature storage and life-time properties relatively to those from the lithium secondary batteries of Comparative Examples.

While the present disclosure has been described with respect to the specific embodiments, it will be apparent to those skilled in the art that various changes and modifications may be made without departing from the spirit and scope of the disclosure as defined in the following claims and equivalents thereof.

What is claimed is:

1. An anode active material for lithium secondary battery, comprising a secondary particle formed by agglomerating primary particles,
   wherein an average diameter of the primary particles is in a range from 5 μm to 15 μm;
   an average diameter of the secondary particle is in a range from 10 μm to about 25 μm;
   the primary particles and the secondary particle are an artificial graphite; and
   an I(110)/I(002) of the secondary particle is in a range from about 0.0075 to 0.012.

2. The anode active material of claim 1, wherein the I(110)/I(002) of the secondary particle is in a range from about 0.0075 to 0.01.

3. The anode active material of claim 1, wherein the average diameter of the primary particles is in a range from 7 μm to 10 μm.

4. The anode active material of claim 1, wherein the average diameter of the secondary particle is in a range from 13 μm to 20 μm.

5. A lithium secondary battery, comprising:
   an anode including the anode active material of claim 1;
   a cathode; and
   a separation layer interposed between the anode and the cathode.

6. The lithium secondary battery of claim 5, wherein a density of the anode is at least 1.6 g/cc.

7. The lithium secondary battery of claim 5, wherein the anode further includes a binder, and an amount of the binder is equal to or less than 3 weight percent (wt %) based on a total amount of the anode active material and the binder.

* * * * *